June 8, 1926.
G. L. KNOX
1,587,842
REEL HANDLING TRAILER
Filed July 29, 1922      2 Sheets-Sheet 1
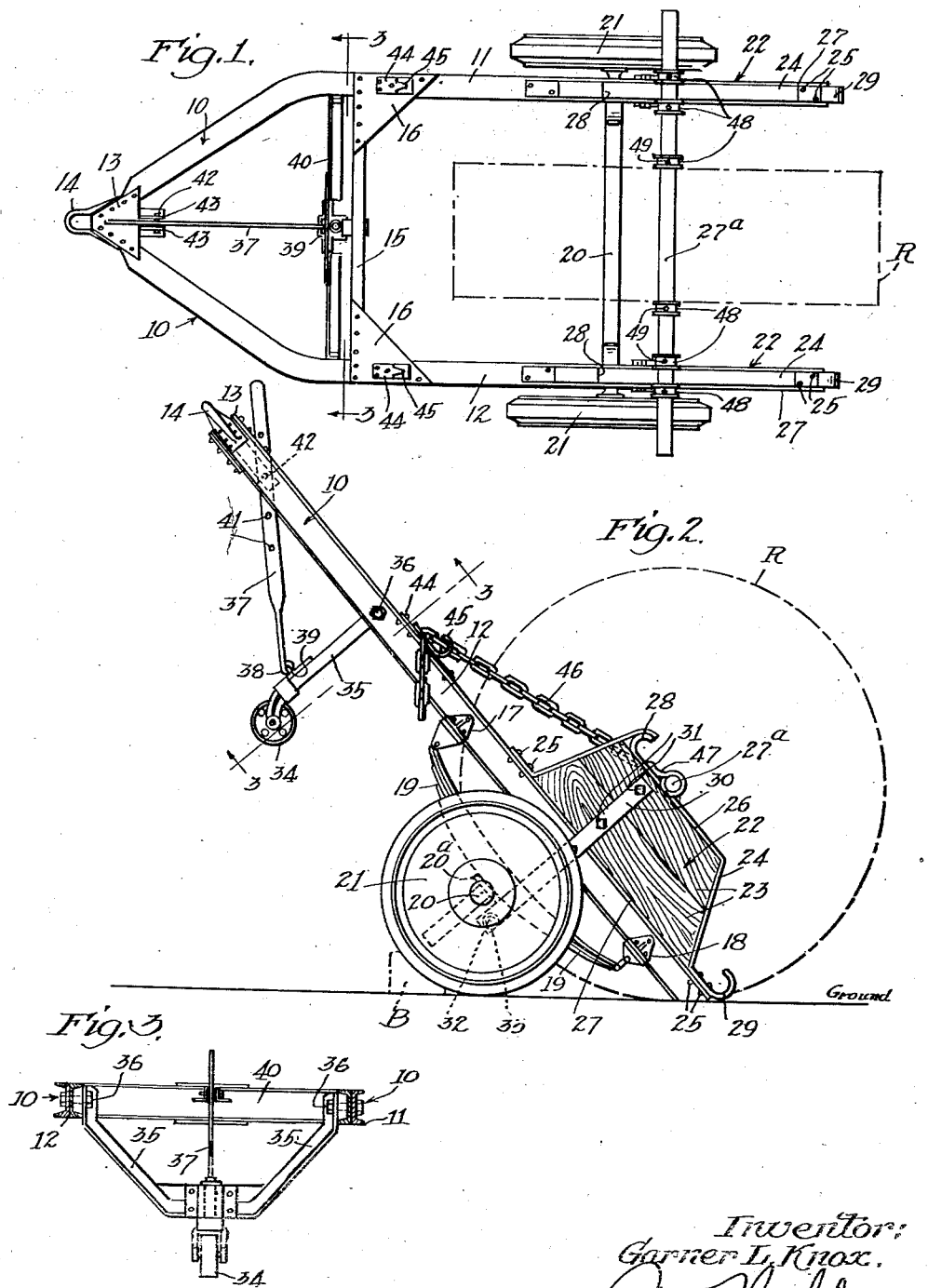

June 8, 1926.
G. L. KNOX
1,587,842
REEL HANDLING TRAILER
Filed July 29, 1922.   2 Sheets-Sheet 2
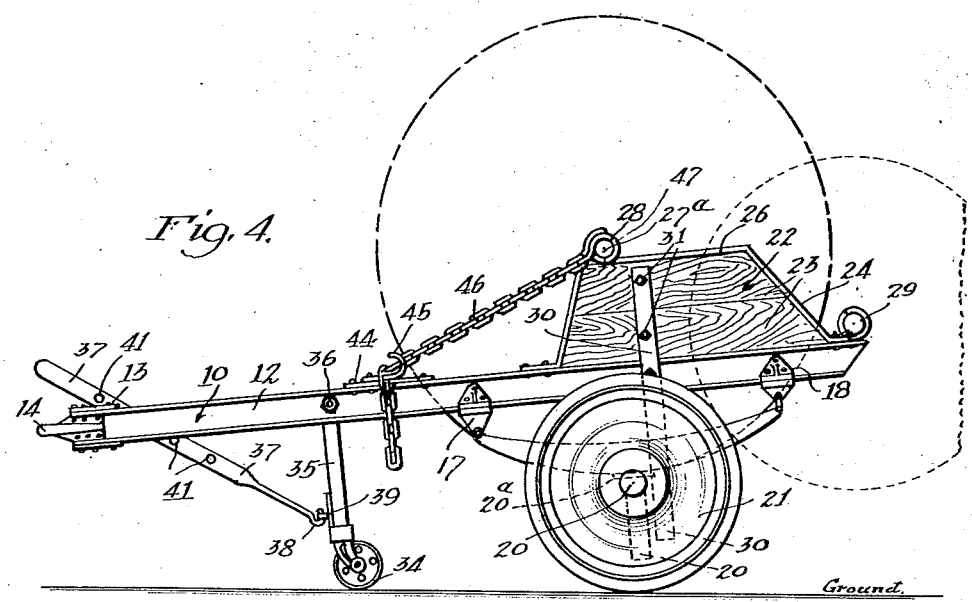
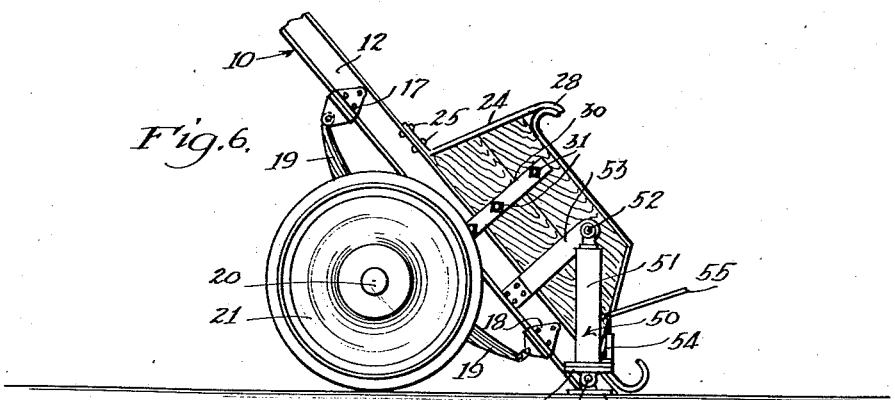
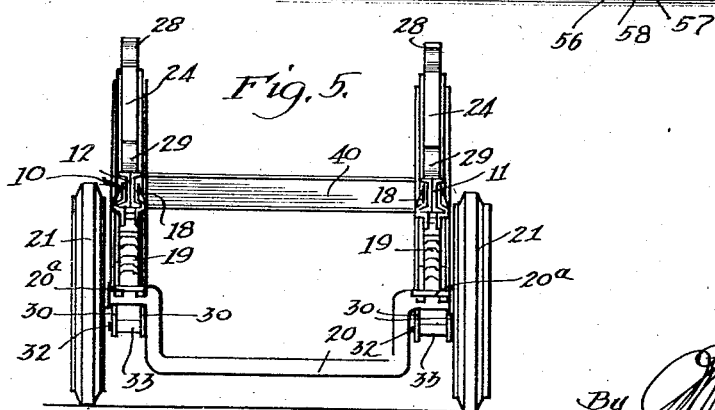
Inventor
Garner L. Knox
By
his Attorney Patented June 8, 1926.

1,587,842

UNITED STATES PATENT OFFICE.

GARNER L. KNOX, OF LOS ANGELES, CALIFORNIA, ASSIGNOR TO UTILITY TRAILER MANUFACTURING COMPANY, A CORPORATION OF CALIFORNIA.

REEL-HANDLING TRAILER.

Application filed July 29, 1922. Serial No. 578,439.

This invention relates generally to a class of vehicles commonly known as trailers, adapted to be drawn by other vehicles, such as motor trucks, tractors and the like; and specifically appertains to a vehicle adapted for handling wire and cable reels, and the like.

While the invention, which will be hereinafter described in its preferred specific embodiment, has been primarily designed for handling and transporting wire and cable reels, and similar objects, it need not be necessarily limited to such uses, but may be utilized in other situations where applicable. Therefore, the following disclosure, together with the accompanying illustrations, is not to be construed as limiting the invention to such particular uses, but is to be understood as given merely to best disclose its principles of construction and operation; permissible uses and variations in structure being limited only by the appended claims.

The particular desideratum in handling wire reels, which are generally quite large and bulky, was the provision of some means whereby they could be loaded, transported and unloaded, without the aid of expensive equipment, such as derricks, hoists and the like, and with a minimum of time and manual labor. With these conditions in view I have provided a trailer, by means of which large and unwieldy objects, such as wire reels, may be easily picked up or loaded, transported from place to place, and as easily unloaded, with a minimum expenditure of time and manual effort.

My invention is particularly characterized by its extreme simplicity of construction, durability and low cost of manufacture; and also its ease and efficiency of operation.

I will describe its principle of construction and operation in the following specification, reference being made therein to the accompanying drawings, in which I have illustrated the preferred specific form, and in which:

Fig. 1 is a plan view thereof; Fig. 2 is a side elevation showing it in tilted or loading position; Fig. 3 is a transverse vertical section, taken as indicated by the line 3—3 of Figs. 1 and 2; Fig. 4 is a side elevation, showing the trailer in horizontal or transporting position; Fig. 5 is a rear elevation; and Fig. 6 is a fragmentary side elevation, showing the device in tilted position as in Fig. 2, and illustrating the attachment of a hydraulic jack for raising it to a horizontal or transporting position.

In the drawings the numeral 10 designates generally a U-shaped frame, consisting of two longitudinal side members 11 and 12, bent inwardly and joined together at their forward ends, as by means of plates 13. A draft hook or loop member 14 is secured to these frame members at their forward ends, into which a chain or other draft device may be secured for drawing the trailer. The side frame members may be, and preferably are, constructed of I-beam steel, or two channel irons placed back to back and securely bolted together. A transverse brace member 15 extends between the side members 11 and 12, adjacent their forward joined ends, (see Fig. 1); being secured in place, and itself rigidly braced by means of plates 16.

The frame 10 is supported, by means of brackets 17 and 18, upon leaf springs 19; which springs are in turn supported upon an axle 20, on the outer ends of which wheels 21 are mounted. The axle 20 is U-shaped in configuration, as clearly shown in Fig. 5, to allow free clearance for carrying the wire reel between the frame members 11 and 12, as will be later more fully explained. It is to be noted that the springs 19 are rigidly secured to the axle 20, by means of U-bolts or otherwise; resting upon integral plates 20$^a$ so that when the frame 10 is tilted, as illustrated in Fig. 2, the axle 20 (shown in dotted lines) will be out of the way as much as possible when loading the reels.

The frame 10 is so mounted upon the wheels 21 that the major portion of its length will be forward of a line passing at right angles thereto through the center of the axle 20; but the proportionate length extending on either side of the axle will vary according to circumstances, depending upon the work the trailer is to do, its size, diameter of wheels 21, etc. In each instance, however, those portions of the frame members 11 and 12 extending to the rear of the axle 20 are to engage the ground surface and act as stops to limit the tilting angle of the frame 10; and, of course, these lengths will be varied according to the angle to which it is desired to tilt this frame for loading purposes. The proportionate length of the frame 10 which extends forward of the axle 20 will, in each case, be sufficient to overbalance the trailer towards the front, when in a horizontal position, and whether loaded or otherwise; and to provide sufficient leverage to raise heavy loads at the rear end.

The numerals 22 designate generally a pair of reel supporting members, carried on the frame members 11 and 12; and so mounted as to extend from points a short distance forward of the axle 20, to substantially the rear ends of these frame members. They may be constructed of any suitable material, but preferably they are constructed of heavy planking 23, placed on edge, and bound by and securely held in place by strips of heavy band iron 24. The band iron 24 is bent to closely conform to the configuration of the members 22, extending around their edges and secured to the frame members 11 and 12, at each end of the members 22, by means of rivets or bolts 25. The top edges of the members 22, which are covered by the band-iron 24, form tracks or supporting surfaces 26, parallel to the top edges 27, of the side frame members 11 and 12, upon which a cylindrical axle 27ᵃ is supported, for carrying the wire reels, and upon which this axle rolls during the loading and unloading operations. The track 26 is of a length to extend from a point slightly forward of the axle 20, to a point adjacent the rear ends of the side frame members 11 and 12, so that reels of different diameters may be handled, as will be later described.

A semi-circular stop hook 28 is formed on each of the members 22 by the band iron 24; being positioned so their centers will be slightly forward of the axle 20 with their open sides towards the rear of the frame, as clearly shown in Fig. 2. These hooks 28 are to act as stops for the axle 27, and against which it will rest when the trailer is in its substantially horizontal or transporting position, as shown in Fig. 4. Similar hooks 29, having their open sides facing in the opposite direction to those of the hooks 28, are formed by the band-irons 24 and positioned at the extreme ends of the frame members 11 and 12, as shown. These hooks 29 are for the purpose of picking up and transporting wire reels of a smaller size, or of too small sizes, to be picked up on the tracks 26. Its use is clearly shown in Fig. 4.

A pair of members 30 is secured to opposite faces of each of the members 22, as by means of bolts 31, and extend downwardly to points a short distance below the bottom faces of the springs 19; their lower ends being joined by bolts or pins 32 and held in spaced relation by tubular spacing members 33. These members 30 are also rigidly bolted to the side frame members 11 and 12. In addition to bracing and supporting the members 22, the spacer members 33 are adapted to engage the bottom faces of the springs 19 to limit upward movement of the frame 10 upon rebound of the springs.

A caster wheel 34 is carried upon the lower end of a supporting frame 35; the frame 35 depending from and being pivotally mounted upon the frame members 11 and 12, as at 36. The frame 35 may be located at any convenient point forward of the axle 20, but preferably substantially midway between this axle and the forward end of the frame 10. It provides a support for the forward end of the frame 10 when resting in its substantially horizontal position, or in position for transporting its load, as shown in Fig. 4.

In order that the axle 27 will be held against the stops 28, when transporting a wire reel, the caster wheel 34 is situated at such a distance below the top faces 27 of the frame members 11 and 12, as to permit a slight forward inclination of the frame 10, as shown in Fig. 4. The caster wheel frame 35 is rigidly held in proper position by means of a brace bar 37, having a hooked end 38 which engages in an eye or loop 39, secured to a transverse member 40 of the frame 35. The opposite end of the bar 37 is flat and provided with a plurality of holes 41 through one of which a pin 42 extends. The pin 42 is carried by a pair of parallel members 43, secured to the forward end of the frame 10; and by means of this pin 43 and plurality of holes 41, the frame 35 may be held in different adjusted positions about its pivotal point 36, to vary the degree of inclination of the frame 10 when the caster wheel 34 is resting upon the ground surface; or to raise tne caster wheel out of ground engaging position during transportation.

A pair of plates 44, having claws 45 formed on their rear ends, is secured upon the frame members 11 and 12, somewhat forward of the members 22. A pair of pull-chains 46, having hooks 47 for engaging the axle 27 (see Figs. 2 and 4) is provided, and the claws 45 are adapted to receive the links of these chains to hold the axle 27 in proper position upon the tracks 26 during loading and transporting, as will be later fully explained.

In operation, a wire reel of the large size, shown in dot-dash lines in Figs. 2 and 4, and designated by the letter R, is resting upon the ground surface. The axle 27 is extended through coaxial holes or bores in its sides. For convenience, and to conduce to more efficient handling, a plurality of flanged sleeve members 48 are then slipped upon the shaft 27, and secured in place by means of cap screws 49. Two of the sleeves 48 are moved against the sides of the reel R and secured by tightening the cap screws 49, and these serve to hold the reel centered upon the axle. Two pairs of the sleeves 48 are then slipped upon the shaft 27 and positioned to engage opposite sides of the bands 24 forming the tracks 26 (see Fig. 1) and then secured in place by tightening their respective cap screws 49. The sleeves 48 thus engaging the tracks 26 will prevent a twisting of the shaft 27 upon the tracks during loading or unloading of the reel.

After the axle has been thus adjusted to the reel R the trailer is then tilted to the position shown in Fig. 2, and backed up to it, with the frame members 11 and 12 extending on either side thereof, until the tracks 26 engage the shaft 27, intermediate the pairs of sleeves 48, just described. The pull-chains 46 are then adjusted in place by slipping the hooks 47 over the axle 27, on either side of the reel, and then adjusting their opposite ends in the claws 45 to be securely held in place. After this is done the forward end of the frame 10 is then tipped downwardly, to the position shown in Fig. 4, where it will be stopped by engagement of the caster wheel 34 with the ground surface. This effects a forward downward tilting of the frame 10, and also the tracks 26, which will cause the shaft 27 to roll forward upon the latter where it will engage and be held by the stops 28. After rolling into engagement with the stops 28 the pull-chains 46 are then tightened by readjustment in the claws 45, to thus hold the shaft 27 against the stops 28, which will be forward of the axle 20, as hereinbefore described. Thus the bulk of the load will be forward of the axle 20 and be supported by the wheels 21 and caster wheels 34. During transportation, as for instance by attachment of the forward end of the frame 10 to a truck or the like, which will support it, the caster wheel 34 may be raised out of engagement with the ground surface by swinging the frame 35 upon its pivots 36 towards the front end of the frame, and securing it in this position by extending the pin 42 through one of the rear holes 41.

To unload the trailer it is only necessary to disconnect the hooks 47 from the shaft 27, and raise the forward end of the frame 10 sufficient to permit the shaft 27, with its load, to roll down and off the track 26, onto the ground.

When loading, as hereinbefore described, blocks shown in dot-dash lines in Fig. 2 and designated by the letter B, may be inserted under the forward sides of the wheels 21, to hold them while the forward end of the frame 10 is being pulled down to raise the reel off the ground upon the tracks 26, and roll the shaft 27 forward against the stops 28. Thus the frame 10 may be pulled down from its incline to its transporting position by attaching it to the vehicle by which it is to be transported and moving this vehicle sufficient to load the trailer.

Small reels may be picked up in the manner hereinbefore described, by engagement of the hooks 29 with their shaft 27; and these smaller reels are transported in the manner illustrated in Fig. 4.

If desired the trailer may be equipped with hydraulic jacks 50, as illustrated in Fig. 6. These may consist of cylinders 51, pivotally mounted at their upper ends, as at 52, upon brackets 53, secured on opposite sides of the trailer to each of the side frame members 11 and 12, at about the positions illustrated. These jacks may be provided, adjacent their lower ends, with pumps 54, having operating handles 55, by means of which their plungers are forced outwardly to raise the rear end of the trailer off of the ground. The pump plungers may be provided with plates 56 secured to their lower ends, and to which plates ground engaging shoes 57 may be pivotally mounted, by means of pins 58. When the frame 10 is extending in its substantially horizontal position, or during transportation of its load, the pumps 50 will swing upon their pivots 52 and hang in a substantially vertical position; and when the frame 10 is tilted for loading the pumps 50 will swing to substantially the position shown in the drawings, where the shoes 57 will engage the ground surface, ready for operation.

While I have shown and described the preferred specific embodiment of my invention, I nevertheless reserve the right to make such changes or modifications in structure as will properly come within the scope of the appended claims.

I claim:

1. A vehicle of the character described comprising a U-shaped frame, wheels tiltably supporting said frame adjacent its rear open end, parallel tracks extending longitudinally of said frame and supported thereon adjacent its open end, said tracks being elevated above the plane of the frame, a reel supporting shaft rollable on said tracks, said shaft having guide means engaging said tracks, stops on said tracks to limit forward rolling movement of the shaft thereon, adjustable means to hold the shaft against rearward rolling movement on said tracks when the frame is tilted, and shaft engaging hooks on said frame rearwardly of and below the plane of said tracks.

2. A vehicle of the character described, comprising a U-shaped frame, wheels tiltably supporting the frame, tracks supported on and above the frame near its open end, and a web between the frame and each track for supporting the tracks, a pair of bars secured on opposite sides of each web and extending down below the frame, and frame supporting springs located between the bars, the bars carrying transverse members below the springs.

3. A vehicle of the character described comprising a U-shaped frame, wheels tiltably supporting said frame adjacent its rear open end, parallel tracks extending longitudinally of said frame and supported thereon adjacent its open end, said tracks being elevated above the plane of the frame, a web between the frame and each track for supporting the tracks, a reel supporting shaft rollable on said tracks, said shaft having guide means engaging said tracks, stops on said tracks to limit forward rolling movement of the shaft thereon, adjustable means to hold the shaft against rearward rolling movement on said tracks when the frame is tilted, and shaft engaging hooks on said frame rearwardly of and below the plane of said tracks.

4. A vehicle of the character described, comprising a U-shaped frame, wheels tiltably supporting said frame adjacent its rear open end, parallel tracks extending longitudinally of said frame adjacent its open end and adapted to engage and support a reel supporting shaft or the like, stops on said tracks at their forward ends, means to hold a reel shaft or the like against rearward movement on said tracks, and shaft engaging hooks on the frame rearwardly of and below the plane of said tracks.

5. A vehicle of the character described, comprising a U-shaped frame, wheels tiltably supporting said frame adjacent its open rear end, parallel web-supported track structures mounted on the two sides of the frame adjacent its open end, said structures including upper parallel tracks supported at an elevation above the plane of the frame, and the webs of said structures extending between the tracks and the frame, a stop at the forward end of each track, and means associated with each track to prevent rearward motion of a reel shaft or the like on the tracks.

6. A vehicle of the character described, comprising a U-shaped frame, wheels tiltably supporting said frame adjacent its open rear end, parallel web-supported track structures mounted on the two sides of the frame adjacent its open end, said structures including upper parallel tracks supported at an elevation above the plane of the frame, and the webs of said structures extending between the tracks and the frame, a stop at the forward end of each track, and means associated with each track to prevent rearward motion of a reel shaft or the like on the tracks and to hold a reel shaft or the like forwardly against the stops at the forward end of each track.

In witness that I claim the foregoing I have hereunto subscribed my name this 22nd day of July 1922.

GARNER L. KNOX.